(12) United States Patent
Hagiwara (10) Patent No.: US 12,230,805 B2
(45) Date of Patent: Feb. 18, 2025

(54) ALL SOLID STATE BATTERY

(71) Applicant: TOYOTA JIDOSHA KABUSHIKI KAISHA, Toyota (JP)

(72) Inventor: Hideki Hagiwara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 558 days.

(21) Appl. No.: 17/549,215

(22) Filed: Dec. 13, 2021

(65) Prior Publication Data

US 2022/0190345 A1 Jun. 16, 2022

(30) Foreign Application Priority Data

Dec. 14, 2020 (JP) .................................. 2020-206463
Nov. 22, 2021 (JP) .................................. 2021-189323

(51) Int. Cl.
*H01M 4/62* (2006.01)
*H01M 4/02* (2006.01)
(Continued)

(52) U.S. Cl.
CPC ........... *H01M 4/625* (2013.01); *H01M 4/134* (2013.01); *H01M 4/386* (2013.01);
(Continued)

(58) Field of Classification Search
CPC ......... H01M 10/0525; H01M 10/0585; H01M 2004/021; H01M 2004/027; H01M 4/625; H01M 4/134; H01M 4/386
(Continued)

(56) References Cited

U.S. PATENT DOCUMENTS

2004/0072076 A1* 4/2004 Matsubara ............... H01B 1/24
252/511
2008/0268338 A1 10/2008 Lee et al.
(Continued)

FOREIGN PATENT DOCUMENTS

CN 101295781 A 10/2008
CN 108807844 A 11/2018
(Continued)

OTHER PUBLICATIONS

Lin et al., "Orientation Control of Graphene Flakes by Magnetic Field: Broad Device Applications of Macroscopically Aligned", Nov. 2016, Advanced Materials (Year: 2016).*

*Primary Examiner* — Christian Roldan
*Assistant Examiner* — Robert Gene West
(74) *Attorney, Agent, or Firm* — Dinsmore & Shohl LLP (57) ABSTRACT

A main object of the present disclosure is to provide an all solid state battery wherein the confining pressure variation is suppressed. The present disclosure achieves the object by providing an all solid state battery comprising a cathode current collector, a cathode active material layer, a solid electrolyte layer, an anode active material layer, and an anode current collector stacked in this order, and the anode active material layer includes a Si based active material, and a graphite, when a graphite wherein an angle formed by a plane direction of (002) plane of the graphite, and a stacking direction surface of the anode current collector is 45° or more and 90° or less, is regarded as a crossing graphite, a proportion of the crossing graphite among the graphite is more than 20 mass %.

1 Claim, 3 Drawing Sheets

(51) Int. Cl.
*H01M 4/134* (2010.01)
*H01M 4/38* (2006.01)
*H01M 10/0525* (2010.01)
*H01M 10/0585* (2010.01)

(52) U.S. Cl.
CPC ... *H01M 10/0525* (2013.01); *H01M 10/0585* (2013.01); *H01M 2004/021* (2013.01); *H01M 2004/027* (2013.01)

(58) Field of Classification Search
USPC .......................................................... 429/162
See application file for complete search history.

(56) References Cited

U.S. PATENT DOCUMENTS

| | | | | |
|---|---|---|---|---|
| 2014/0065478 | A1* | 3/2014 | Mitsuhashi | H01M 4/583 |
| | | | | 427/547 |
| 2014/0170487 | A1 | 6/2014 | Takahata et al. | |
| 2015/0004488 | A1* | 1/2015 | Abdelsalam | H01M 4/587 |
| | | | | 252/502 |
| 2015/0030931 | A1 | 1/2015 | Takahata et al. | |
| 2015/0270536 | A1 | 9/2015 | Kawakami et al. | |
| 2018/0315985 | A1 | 11/2018 | Torita et al. | |
| 2020/0313186 | A1* | 10/2020 | Wang | H01M 4/625 |
| 2020/0358080 | A1* | 11/2020 | Maeyama | H01M 10/0562 |

FOREIGN PATENT DOCUMENTS

| | | |
|---|---|---|
| JP | 2018-129212 A | 8/2018 |
| JP | 2018-139214 A | 9/2018 |
| JP | 2018-142431 A | 9/2018 |
| JP | 2019-185943 A | 10/2019 |
| KR | 20140044914 A | 4/2014 |
| KR | 20140094676 A | 7/2014 |
| WO | 2013/088540 A1 | 6/2013 |

* cited by examiner

Electrode part

Load cell    Evaluation cell

ALL SOLID STATE BATTERY

CROSS-REFERENCE TO RELATED APPLICATIONS

This application is based upon and claims the benefit of priority of the prior Japanese Patent Applications No. 2020-206463 filed Dec. 14, 2020, and 2021-189323 filed Nov. 22, 2021, the entire contents of which are incorporated herein by reference.

TECHNICAL FIELD

The present disclosure relates to an all solid state battery.

BACKGROUND ART

An all solid state battery is a battery including a solid electrolyte layer between a cathode layer and an anode layer, and has advantages in that it is easy to simplify a safety device as compared with a liquid battery including a liquid electrolyte containing flammable organic solvents.

For example, Patent Literature 1 discloses an all solid state battery comprising an anode including a Si based active material.

CITATION LIST

Patent Literature

Patent Literature 1: Japanese Patent Application Laid-Open (JP-A) No. 2018-142431

SUMMARY OF DISCLOSURE

Technical Problem

As disclosed in Patent Literature 1, a use of a Si based active material in an anode of an all solid state battery has been known. The theoretical capacity of the Si based active material is large, which is effective in high energy condensation of a battery. On the other hand, the volume variation of the Si based active material is large during charge/discharge so that the confining pressure variation of the all solid state battery may be increased.

The present disclosure has been made in view of the above circumstances, and a main object of the present disclosure is to provide an all solid state battery wherein the confining pressure variation is suppressed.

Solution to Problem

The present disclosure achieves the object by providing an all solid state battery comprising a cathode current collector, a cathode active material layer, a solid electrolyte layer, an anode active material layer, and an anode current collector stacked in this order, and the anode active material layer includes a Si based active material, and a graphite, and when a graphite wherein an angle formed by a plane direction of (002) plane of the graphite, and a stacking direction surface of the anode current collector is 45° or more and 90° or less, is regarded as a crossing graphite, a proportion of the crossing graphite among the graphite is more than 20 mass %.

According to the present disclosure, since the proportion of the crossing graphite is larger than a predetermined value, an all solid state battery wherein the confining pressure variation is suppressed, may be obtained.

In the disclosure, the proportion of the crossing graphite may be 50 mass % or more.

In the disclosure, a mass ratio of the graphite to the Si based active material may be 0.05 or more and 0.3 or less.

In the disclosure, when a thickness of the anode active material layer is regarded as "x" (μm), and an average particle size ($D_{50}$) of the graphite is regarded as "y" (μm), y/x may be 0.16 or more and 0.56 or less.

Effects of Disclosure

The present disclosure exhibits effects such that an all solid state battery wherein the confining pressure variation is suppressed, may be provided.

DESCRIPTION OF EMBODIMENTS

Figure 1:
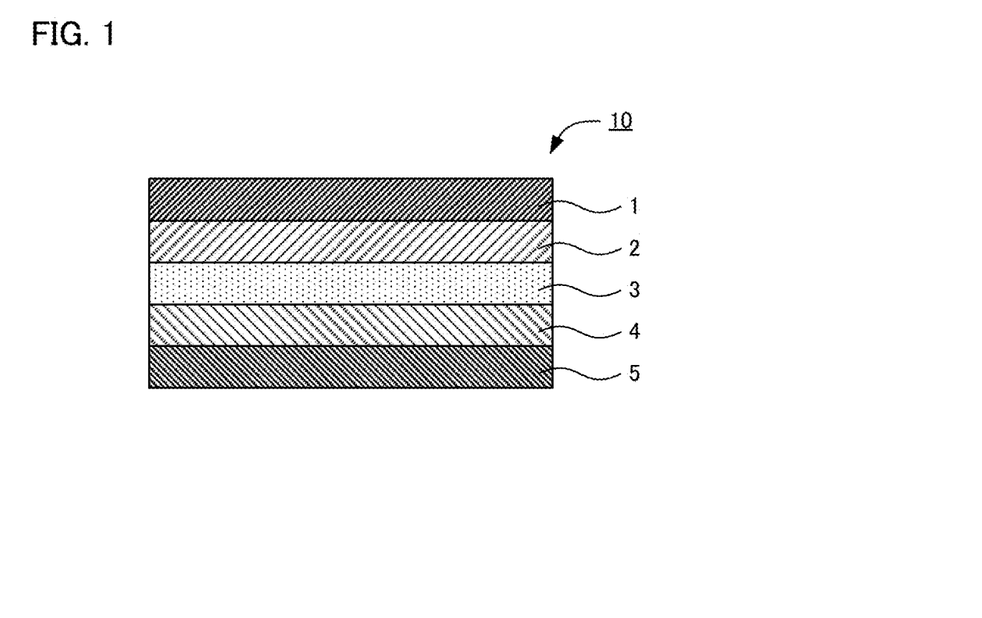
FIG. 1 is a schematic view illustrating an example of an all solid state battery in the present disclosure.

The all solid state battery in the present disclosure will be hereinafter described in detail. FIG. 1 is a schematic view illustrating an example of an all solid state battery in the present disclosure. All solid state battery 10 shown in FIG. 1 comprises cathode current collector 1, cathode active material layer 2, solid electrolyte layer 3, anode active material layer 4, and anode current collector 5 stacked in this order. Also, anode active material layer 4 includes a Si based active material, and a graphite. And in anode active material layer 4, the proportion of the crossing graphite among the graphite is more than a predetermined value. Incidentally, in the present specification, when merely expressed as "graphite", it means all of the graphite included in the anode active material layer. That is, the term "graphite" in the present specification also includes "crossing graphite".

Figure 2A:
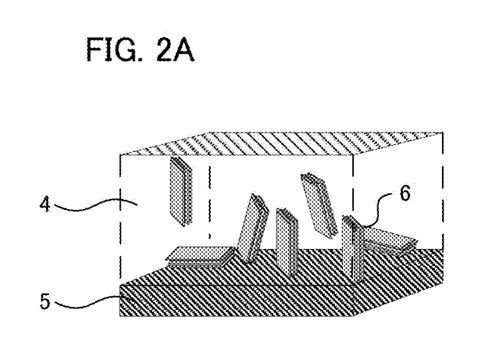
FIG. 2A is a view for illustrating a crossing graphite in the present disclosure.
Figure 2B:
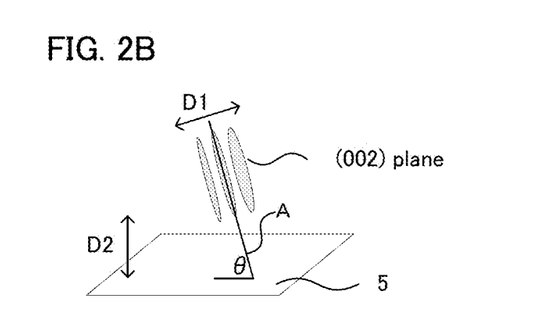
FIG. 2B is a view for illustrating a crossing graphite in the present disclosure.

Here, the crossing graphite will be described referring to the drawings. FIGS. 2A and 2B are views for illustrating a crossing graphite in the present disclosure. As shown in FIG. 2A, crossing graphite 6 is included in anode active material layer 4, and is crossed to the stacking direction surface of anode current collector 5. In more detail, as shown in FIG.

2B, among the graphite included in anode active material layer 4, crossing graphite 6 is a graphite wherein angle θ formed by plane direction A of (002) plane of the graphite, and stacking direction D2 surface of anode current collector 5 is 45° or more and 90° or less. Also, in the present specification, "(0002) plane" denotes a layer plane of a graphite having layered structure (a plane horizontal to a graphite layer) that is a plane horizontal to a carbon network of a graphene sheet constituting the graphite. Also, "plane direction of (002) plane" denotes direction A perpendicular to stacking direction D1 of each layer of a graphite, as shown in FIG. 2B. Meanwhile, "stacking direction surface of an anode current collector" denotes a major surface of an anode current collector, and as shown in FIG. 2B, it denotes a surface wherein the normal direction thereof is equal to stacking direction D2 of each layer constituting a battery. That is, the crossing graphite in the present disclosure corresponds to a graphite wherein the angle of the plane direction of (002) plane of the graphite, with respect to the major surface of the anode current collector is 45° or more and 90° or less.

According to the present disclosure, since the proportion of the crossing graphite is larger than a predetermined value, an all solid state battery wherein the confining pressure variation is suppressed, may be obtained. The reason therefor is believed that the crossing graphite functions as a pillar in the anode active material layer.

1. Anode Active Material Layer

The anode active material layer in the present disclosure includes a Si based active material, and a graphite. Also, the proportion of the crossing graphite among the graphite is more than a predetermined value.

The anode active material layer in the present disclosure includes a graphite. The content of the graphite is, for example, 5 mass % or more, may be 10 mass % or more, and may be 20 mass % or more. Meanwhile, the content of the graphite is, for example 40 mass % or less, and may be 30 mass % or less.

Also, in the anode active material layer, when a graphite wherein an angle formed by a plane direction of (002) plane of the graphite, and a stacking direction surface of the anode current collector is 45° or more and 90° or less, is regarded as a crossing graphite, a proportion of the crossing graphite among the graphite is more than a predetermined value. The proportion of the crossing graphite (crossing ratio) is more than 20 mass %, may be 30 mass % or more, may be 40 mass % or more, and may be 50 mass % or more. Meanwhile, the crossing ratio is, for example, 100 mass % or less, may be 90 mass % or less, may be 80 mass % or less, and may be 70 mass % or less. When the proportion of the crossing graphite is too low, the confining pressure variation suppressing effect may not be obtained sufficiently. A method for calculating the crossing ratio will be explained in Examples later. Also, a method for crossing a graphite with respect to an anode current collector, and a method for adjusting the ratio will also be described later.

In some embodiments, when a crossing graphite that is orthogonally crossed to the stacking direction surface of the anode current collector is regarded as an orthogonally crossing graphite, the orthogonally crossing graphite is major in the crossing graphite. The "crossing graphite that is orthogonally crossed to the stacking direction surface of the anode current collector" denotes a crossing graphite wherein an angle θ formed by plane direction A shown in FIG. 2B, and the stacking direction surface of the anode current collector is 80° or more and 90° or less. Also, "the orthogonally crossing graphite is major in the crossing graphite" means that the proportion of the orthogonally crossing graphite to the total amount of the crossing graphite is 50 mass % or more. The proportion of the orthogonally crossing graphite may be 70 mass % or more, may be 90 mass % or more, and may be 100 mass %.

The average particle size ($D_{50}$) of the graphite is, for example, 5 μm or more, may be 7 μm or more, may be 10 μm or more, and may be 20 μm or more. Meanwhile, $D_{50}$ is, for example, 50 μm or less, may be 45 μm or less, may be 40 μm or less, and may be 30 μm or less. The average particle size ($D_{50}$) may be determined from the result of a particle size distribution measurement by a laser diffraction scattering method.

The anode active material layer in the present disclosure includes a Si based active material. The Si based active material may be a Si simple substance, and may be a Si compound. Examples of the Si compound may include a Si alloy, and a Si oxide. In some embodiments, the Si alloy includes a Si element as a main component. The proportion of the Si element in the Si alloy is, for example, 50 at % or more, may be 70 at % or more, and may be 90 at % or more. Examples of the Si oxide may include SiO.

The content of the Si based active material is, for example, 20 mass % or more, may be 30 mass % or more, and may be 40 mass % or more. Meanwhile, the content of the Si based active material is, for example 80 mass % or less, may be 70 mass % or less, and may be 60 mass % or less.

In some embodiments, in the anode active material layer, the mass ratio of the graphite to the Si based active material is in a predetermined range. The mass ratio is, for example, 0.05 or more, may be 0.1 or more, and may be 0.15 or more. Meanwhile, the mass ratio is, for example, 0.3 or less, may be 0.25 or less, and may be 0.2 or less. When the mass ratio is too low, the inner resistance of a battery may be increased, and when the mass ratio is too high, the consolidation of the anode active material layer may be decreased.

In some embodiments, in the anode active material layer, when the thickness of the anode active material layer described later is regarded as "x" (μm), and $D_{50}$ of the graphite is regarded as "y" (μm), y/x is in a predetermined range. The y/x is, for example, 0.16 or more, and may be 0.20 or more. Meanwhile, the y/x is, for example, 0.56 or less, may be 0.40 or less, and may be 0.30 or less. When the value of y/x is too low, the inner resistance of a battery may be increased, and when the value of y/x is too high, the consolidation of the anode active material layer may be decreased.

Also, the anode active material layer in the present disclosure may further include at least one of a conductive material other than the graphite, a binder, and a solid electrolyte, as required. Incidentally, the anode active material layer may not include a conductive material other than the graphite, particularly, a carbon material. Examples of the conductive material other than the graphite may include conventionally known conductive materials. Also, examples of the binder may include rubber based binders such as butylene rubber (BR), and styrene-butadiene rubber (SBR); and fluorine based binders such as polyvinylidene fluoride (PVDF). The solid electrolyte will be described in "3. Solid electrolyte layer". Also, the thickness of the anode active material layer is, for example, 0.1 μm or more and 1000 μm or less.

An example of a method for crossing a graphite with respect to an anode current collector in the present disclosure will be described here. Firstly, in the present disclosure, an anode composition including at least a Si based active material and a graphite is prepared, an anode current collector is coated with this composition to form a coating layer. Then, a magnetic field is applied to this coating layer. Due to the alignment control by applying the magnetic field, the graphite may be crossed with respect to the anode current collector. Incidentally, the anode active material layer in the present disclosure may be formed by drying the coating layer after the magnetic field is applied.

Figure 3A:
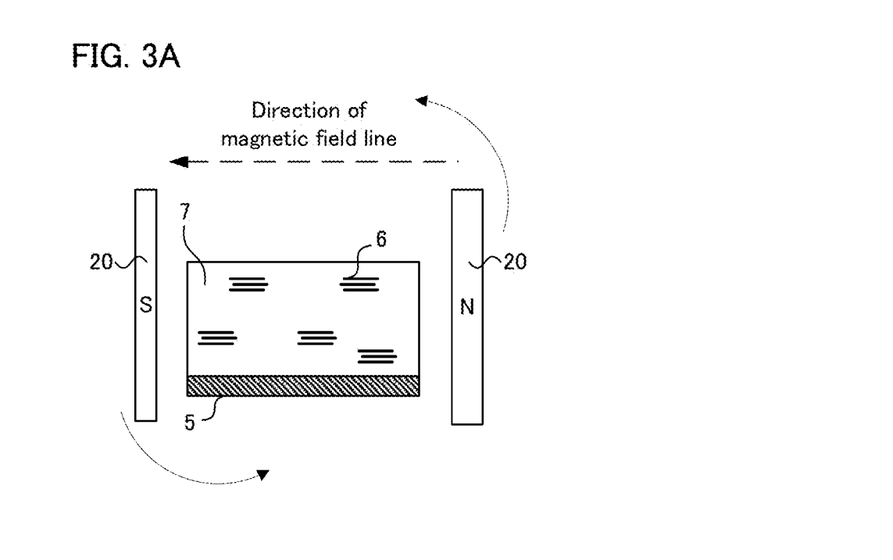
FIG. 3A is a view for illustrating an example of a method for crossing a graphite with respect to an anode current collector in the present disclosure.
Figure 3B:
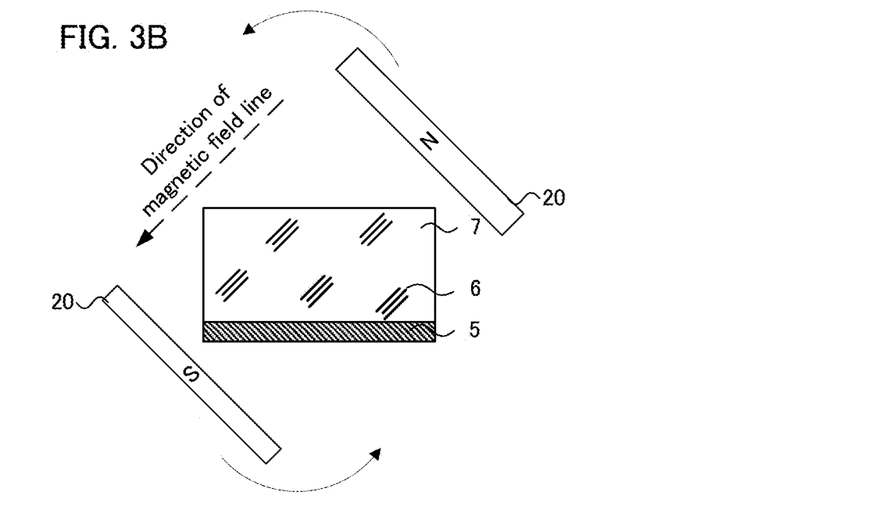
FIG. 3B is a view for illustrating an example of a method for crossing a graphite with respect to an anode current collector in the present disclosure.
Figure 3C:
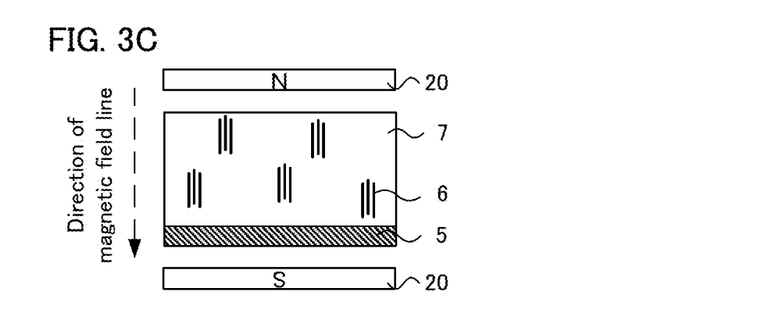
FIG. 3C is a view for illustrating an example of a method for crossing a graphite with respect to an anode current collector in the present disclosure.

A method for applying a magnetic field will be described in further detail referring to drawings. FIGS. 3A to 3C are views for illustrating an example of a method for crossing a graphite with respect to an anode current collector in the present disclosure. Firstly, as shown in FIG. 3A, using a pair of magnetic field generators 20 placed so as to face to each other and to sandwich anode current collector 5 and coating layer 7, a magnetic field that generates a magnetic field line parallel to the surface direction of anode current collector 5, is applied. Thereby, plane direction A of (002) plane of the graphite shown in FIG. 2B is made parallel (that is, θ=0°) with respect to the stacking direction surface of anode current collector 5. Then, as shown in FIG. 3B and FIG. 3C, the angle of the magnetic field line is adjusted by adjusting the angle of magnetic field generators 20 stepwisely, and graphite 6 is crossed with respect to anode current collector 5.

As the magnetic field generator, a conventionally known member such as a magnet and a coil may be used. Also, the conditions such as strength and applying time of the magnetic field are not particularly limited; and may be appropriately adjusted according to a desired crossing ratio, and a viscosity of an anode composition. For example, the strength of the magnetic field is 0.3 T or more and 1 T or less, and the applying time is 5 seconds or more and 2 minutes or less. The crossing ratio may be adjusted by changing these conditions.

2. Cathode Active Material Layer

The cathode active material layer includes at least a cathode active material, and may include at least one of a conductive material, and a solid electrolyte, as necessary. Examples of the cathode active material may include an oxide active material. Examples of the oxide active material may include rock salt bed type active materials such as $LiCoO_2$, $LiMnO_2$, $LiNiO_2$, $LiVO_2$, $LiNi_{1/3}Co_{1/3}Mn_{1/3}O_2$; spinel type active materials such as $LiMn_2O_4$, $Li_4Ti_5O_{12}$, and $Li(Ni_{0.5}Mn_{1.5})O_4$; and olivine type active materials such as $LiFePO_4$, $LiMnPO_4$, $LiNiPO_4$, and $LiCoPO_4$. The surface of the cathode active material may be coated with an ion conductive oxide. Examples of the ion conductive oxide may include $LiNbO_3$. The conductive material and the solid electrolyte are similar to those described above.

The proportion of the cathode active material in the cathode active material layer is, for example, 20 mass % or more, may be 30 mass % or more, and may be 40 mass % or more. Meanwhile, the proportion of the cathode active material is, for example 80 mass % or less, may be 70 mass % or less, and may be 60 mass % or less. Also, the thickness of the cathode active material layer is, for example, 0.1 μm or more and 1000 μm or less.

3. Solid Electrolyte Layer

The solid electrolyte layer is a layer formed between the cathode active material layer and the anode active material layer, and is a layer including at least a solid electrolyte. Also, the solid electrolyte layer may include only the solid electrolyte, and may further include a binder.

Examples of the solid electrolyte may include inorganic solid electrolytes such as sulfide solid electrolyte, oxide solid electrolyte, nitride solid electrolyte, and halide solid electrolyte; and organic polymer electrolytes such as a polymer electrolyte. In some embodiments, the sulfide solid electrolyte is used. The thickness of the solid electrolyte layer is, for example, 0.1 μm or more and 1000 μm or less.

4. Cathode Current Collector and Anode Current Collector

The all solid state battery in the present disclosure comprises a cathode current collector configured to collect electrons of the cathode active material layer and an anode current collector configured to collect electrons of the anode active material layer. Examples of the materials for the cathode current collector may include SUS, aluminum, nickel, iron, titanium, and carbon. Meanwhile, examples of the materials for the anode current collector may include SUS, copper, nickel, and carbon. In some embodiments, the thickness and the shape, for example of the cathode current collector and the anode current collector are appropriately selected according to the use of the all solid state battery.

5. All Solid State Battery

Also, the all solid state battery in the present disclosure may further include a confining jig that applies a confining pressure along the thickness direction, to the cathode current collector, the cathode active material layer, the solid electrolyte layer, the anode active material layer, and the anode current collector. A known jig may be used as the confining jig. The confining pressure is, for example, 0.1 MPa or more, and may be 1 MPa or more. Meanwhile, the confining pressure is, for example, 50 MPa or less, and may be 20 MPa or less.

The kind of the all solid state battery in the present disclosure is not particularly limited; and typically a lithium ion battery. In some embodiments, the all solid state battery in the present disclosure may be a primary battery and may be a secondary battery; above all, the secondary battery so as to be repeatedly charged and discharged, and be useful as a car-mounted battery, for example.

The all solid state battery in the present disclosure may be a single cell battery and may be a stacked battery. The stacked battery may be a monopolar type stacked battery (a stacked battery connected in parallel), and may be a bipolar type stacked battery (a stacked battery connected in series). Examples of the shape of the battery may include a coin shape, a laminate shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Comparative Example 1

<Formation of Anode Active Material Layer>

A paste anode composition was prepared by mixing a Si based anode active material (Si simple substance), a dispersant (butyl butyrate), a binder (butyl butyrate solution containing 5 weight % of a PVDF based binder), a sulfide solid electrolyte ($Li_2S$—$P_2S_5$ based glass ceramic including LiBr, and LiI), and a conductive material (VGCF). Incidentally, the Si simple substance and the VGCF were weighed so as the mass ratio was 100:15. An anode active material layer was formed by coating a nickel foil (anode current collector) with this composition and drying thereof. Incidentally, since VGCF has no crystal plane corresponding to the (002) plane of the graphite, the alignment cannot be controlled by applying a magnetic field.

<Production of Evaluation Cell>

A paste cathode composition was prepared by mixing a cathode active material ($LiNi_{1/3}CO_{1/3}Mn_{1/3}O_2$), a dispersant (butyl butyrate), a binder (butyl butyrate solution containing 5 weight % of a PVDF based binder), a sulfide solid electrolyte ($Li_2S$—$P_2S_5$ based glass ceramic including LiBr, and LiI), and a conductive material (VGCF). A cathode active material layer was formed by coating an aluminum foil (cathode current collector) with this composition and drying thereof.

A solid electrolyte composition was prepared by mixing a dispersant (heptane), a binder (heptane solution containing 5 weight % of a butadiene rubber), and a sulfide solid electrolyte ($Li_2S$—$P_2S_5$ based glass ceramic including LiBr, and LiI). A solid electrolyte layer was formed by coating an aluminum foil (substrate) with this composition and drying thereof.

Figure 4A:
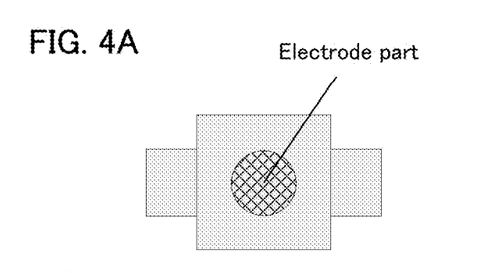
FIG. 4A is a view for illustrating a method for measuring a confining pressure variation in Examples and Comparative Examples.
Figure 4B:
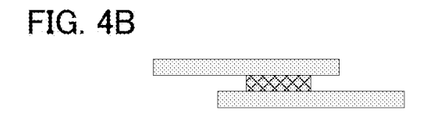
FIG. 4B is a view for illustrating a method for measuring a confining pressure variation in Examples and Comparative Examples.

The solid electrolyte layer was stacked on the cathode active material layer so that the solid electrolyte layer was in contact with the cathode active material layer, and pressed. Then, the substrate (aluminum foil) of the solid electrolyte layer was peeled off, the anode active material layer was stacked so that the solid electrolyte layer was in contact with the anode active material layer, and pressed. Thereby, an evaluation cell as shown in FIGS. 4A and 4B was produced. Incidentally, the electrode area was 1 cm², and the evaluation cell was produced so as the capacity ratio of the anode to the cathode was 3.

Comparative Example 2

An evaluation cell was produced in the same manner as in Comparative Example 1 except that a graphite ($D_{50}$=7 μm) was used as the conductive material, instead of VGCF.

Example 1-1

An evaluation cell was produced in the same manner as in Comparative Example 2 except that the anode active material layer was formed as follows. Firstly, a paste anode composition was prepared by mixing a Si based anode active material (Si simple substance), a dispersant (butyl butyrate), a binder (butyl butyrate solution containing 5 weight % of a PVDF based binder), a sulfide solid electrolyte ($Li_2S$—$P_2S_5$ based glass ceramic including LiBr, and LiI), and a conductive material (a graphite, $D_{50}$=7 μm). A coating layer was formed by coating a nickel foil (anode current collector) with this composition. Then, a magnetic field was applied to this coating layer so as the graphite was crossed to the anode current collector. The magnetic field was applied by setting the strength of the magnetic field to be 0.495 T so that the direction of the magnetic field line was changed stepwise, as shown in FIG. 3A to FIG. 3C. Thereafter, an anode active material layer was formed by drying the coating layer.

Example 1-2 and 1-3

An evaluation cell was produced in the same manner as in Example 1-1 except that the strength of the magnetic field was changed so that the amount of the crossing graphite to the total graphite amount (crossing ratio) was the value shown in Table 2.

Example 2-1 to 2-5

An evaluation cell was produced in the same manner as in Example 1-1 except that $D_{50}$ of the graphite was changed so that the average particle size ($D_{50}$, μm) of the graphite to the thickness (μm) of the anode active material layer was the value shown in Table 3. Incidentally, the thickness of the anode active material layer denotes the thickness of the anode active material layer after pressing.

Example 3-1 to 3-6

An evaluation cell was produced in the same manner as in Example 1-1 except that the amount of the graphite was changed so that the mass ratio of the graphite and the Si based active material in the anode active material layer was the value shown in Table 4.

[Evaluation]

<Crossing Ratio>

A cross-section of the anode active material layer in the evaluation cells produced in each Example and Comparative Example was obtained by carrying out an ion milling process. Then, the cross-section was observed with a SEM (scanning electron microscope), and the crossing ratio (mass ratio of the crossing graphite with respect to the total graphite) was calculated. The results are shown in Tables 1 to 4. Specifically, the crossing ratio was determined as follows. Firstly, the obtained cross-section SEM image of the anode active material layer was analyzed, and for all the graphite particles, an area, a ratio of the length of the long side and the short side (an aspect ratio), and an angle of the particle long side direction (plane direction of (002) plane) with respect to the anode current collector were digitized. Then, the crossing ratio (mass ratio) was obtained by dividing the total area of the graphite particles wherein the angle was 45° or more and 90° or less by the area of all the graphite particles.

<Confining Pressure Variation>

Figure 4C:
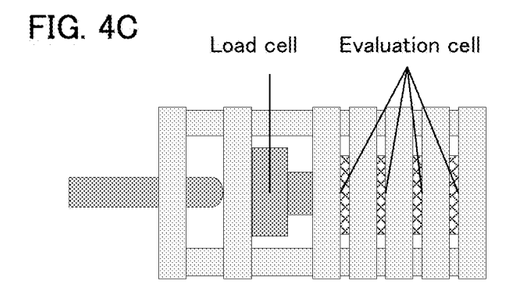
FIG. 4C is a view for illustrating a method for measuring a confining pressure variation in Examples and Comparative Examples.

Four of the above evaluation cells were set in the jig shown in FIG. 4C, the confining pressure variation was measured by a load cell, and the confining pressure variation suppressing effect was evaluated. Specifically, the evaluation was carried out by standardizing the confining pressure variation from the following formula. The results are shown in Tables 1 to 4.

(Confining pressure at completion of charge (MPa)–
confining pressure at initiation of charge
(MPa))/(number of cells×capacity at completion
of charge (mAh))

<Consolidation of Anode Active Material Layer>

By measuring the thickness of the anode active material layer in the evaluation cell (that is, the thickness of the anode active material layer after pressing), whether the thickness of the anode active material layer was consolidated to 45 μm (density of 1.8 g/cc), or not was evaluated relatively. The results are shown in Tables 1 to 4.

<Battery Resistance>

The battery resistance of the evaluation cells produced in Examples 1-1, 2-1, 3-1, and 3-2 was determined by a DCIR measurement. The measurement was carried out by discharging at 1.7 C for 0.1 seconds from SOC (state of charge) 20% at 25° C. The results are shown in Tables 3 and 4.

TABLE 1

|  | Comp. Ex. 1 | Comp. Ex. 2 |
|---|---|---|
| Conductive material | VGCF | Graphite |
| Crossing ratio (wt %) | — | 20 |
| $D_{50}$/thickness | 0.16 | 0.16 |
| $D_{50}$ (μm) | 7 | 7 |

TABLE 1-continued

|  | Comp. Ex. 1 | Comp. Ex. 2 |
|---|---|---|
| Thickness (μm) | 45 | 45 |
| Mass ratio (graphite/active material) | 0.15 | 0.15 |
| Graphite(mass parts) | 15 | 15 |
| Active material(mass parts) | 100 | 100 |
| Confining pressure variation (MPa/mAh) | 0.34 | 0.33 |
| Pressing consolidation | ○ | ○ |

TABLE 2

|  | Ex. 1-1 | Ex. 1-2 | Ex. 1-3 |
|---|---|---|---|
| Conductive material | Graphite | Graphite | Graphite |
| Crossing ratio (wt %) | 50 | 65 | 80 |
| $D_{50}$/thickness | 0.16 | 0.16 | 0.16 |
| $D_{50}$ (μm) | 7 | 7 | 7 |
| Thickness (μm) | 45 | 45 | 45 |
| Mass ratio (graphite/active material) | 0.15 | 0.15 | 0.15 |
| Graphite (mass parts) | 15 | 15 | 15 |
| Active material (mass parts) | 100 | 100 | 100 |
| Confining pressure variation (MPa/mAh) | 0.28 | 0.26 | 0.23 |
| Pressing consolidation | ○ | ○ | ○ |

TABLE 3

|  | Ex. 2-1 | Ex. 1-1 | Ex. 2-2 | Ex. 2-3 | Ex. 2-4 | Ex. 2-5 |
|---|---|---|---|---|---|---|
| Conductive material | Graphite | Graphite | Graphite | Graphite | Graphite | Graphite |
| Crossing ratio (wt %) | 50 | 50 | 50 | 50 | 50 | 50 |
| $D_{50}$/thickness | 0.11 | 0.16 | 0.22 | 0.33 | 0.56 | 0.63 |
| $D_{50}$ (μm) | 5 | 7 | 10 | 15 | 25 | 35 |
| Thickness (μm) | 45 | 45 | 45 | 45 | 45 | 56 |
| Mass ratio (graphite/active material) | 0.15 | 0.15 | 0.15 | 0.15 | 0.15 | 0.15 |
| Graphite (mass parts) | 15 | 15 | 15 | 15 | 15 | 15 |
| Active material (mass parts) | 100 | 100 | 100 | 100 | 100 | 100 |
| Confining pressure variation (MPa/mAh) | 0.29 | 0.28 | 0.26 | 0.24 | 0.26 | 0.25 |
| Pressing consolidation | ○ | ○ | ○ | ○ | ○ | Δ |
| DCIR (Ω) | 32 | 24 | — | — | — | — |

TABLE 4

|  | Ex. 3-1 | Ex. 3-2 | Ex. 1-1 | Ex. 3-3 | Ex. 3-4 | Ex. 3-5 | Ex. 3-6 |
|---|---|---|---|---|---|---|---|
| Conductive material | Graphite | Graphite | Graphite | Graphite | Graphite | Graphite | Graphite |
| Crossing ratio (wt %) | 50 | 50 | 50 | 50 | 50 | 50 | 50 |
| $D_{50}$/thickness | 0.16 | 0.16 | 0.16 | 0.16 | 0.16 | 0.16 | 0.14 |
| $D_{50}$ (μm) | 7 | 7 | 7 | 7 | 7 | 7 | 7 |
| Thickness (μm) | 45 | 45 | 45 | 45 | 45 | 45 | 51 |
| Mass ratio (graphite/active material) | 0.03 | 0.05 | 0.15 | 0.2 | 0.25 | 0.3 | 0.35 |
| Graphit (mass parts) | 3 | 5 | 15 | 20 | 25 | 30 | 35 |
| Active material (mass parts) | 100 | 100 | 100 | 100 | 100 | 100 | 100 |
| Confining pressure variation (MPa/mAh) | 0.29 | 0.29 | 0.28 | 0.28 | 0.25 | 0.22 | 0.21 |
| Pressing consolidation | ○ | ○ | ○ | ○ | ○ | ○ | Δ |
| DCIR (Ω) | 31 | 25 | 24 | — | — | — | — |

As shown in Table. 1, the confining pressure variation value in Comparative Example 2, wherein the anode active material layer was formed by not applying the magnetic field, was similar to that in Comparative Example 1 wherein VGCF was used, and it was confirmed that the confining pressure variation was not suppressed. Incidentally, from the SEM image, it was confirmed that, although the magnetic field was not applied, 20 mass % of the graphite was the crossing graphite with respect to the anode current collector. Meanwhile, as shown in Tables 2 to 4, the crossing ratio may be made larger than 20 mass % by applying the magnetic field, and the confining pressure variation was remarkably suppressed.

Also, as shown in Table 2, it was confirmed that as the crossing ratio got higher, the confining pressure variation suppressing effect was higher. Also, from the results in Examples 1-1, 2-1, 3-1, and 3-2 shown in Table 3 and Table 4, it was confirmed that the battery resistance was decreased by increasing the ratio of $D_{50}$ of the graphite with respect to the thickness of the anode active material layer ($D_{50}$/thickness), and the mass ratio of the graphite with respect to the Si based active material (graphite/active material). Meanwhile, from the results in Examples 2-5, and 3-6, it was suggested that the pressing consolidation was inferior when the $D_{50}$/thickness, and the mass ratio of the graphite with (graphite/active material) were too high.

REFERENCE SIGNS LIST

1 . . . cathode current collector
2 . . . cathode active material layer
3 . . . solid electrolyte layer
4 . . . anode active material layer
5 . . . anode current collector
6 . . . crossing graphite
10 . . . all solid state battery

What is claimed is:

1. An all solid state battery comprising a cathode current collector, a cathode active material layer, a solid electrolyte layer, an anode active material layer, and an anode current collector stacked in this order, and
the anode active material layer includes a Si based active material, and a graphite,
wherein:
a proportion of a crossing graphite among the graphite is more than 20 mass %;
an angle formed by a plane direction of (002) plane of the crossing graphite, and a stacking direction surface of the anode current collector is 45° or more and 90° or less;
a mass ratio of the graphite to the Si based active material is 0.05 or more and 0.3 or less;
the proportion of the crossing graphite is 50 mass % or more and 80 mass % or less;
when a thickness of the anode active material layer is regarded as "x" (μm), and an average particle size ($D_{50}$) of the graphite is regarded as "y" (μm), y/x is 0.16 or more and 0.56 or less; and
the all solid state battery comprises a confining pressure variation in the thickness direction of from 0.21 MPa/mAh to 0.29 MPa/mAh.

* * * * *